United States Patent
Mori

(10) Patent No.: US 10,810,173 B2
(45) Date of Patent: Oct. 20, 2020

(54) SYSTEM AND METHOD FOR DESIGN DATA ANALYZING

(71) Applicant: Yokogawa Electric Corporation, Tokyo (JP)

(72) Inventor: Takeshi Mori, Singapore (SG)

(73) Assignee: Yokogawa Electric Corporation, Tokyo (JP)

( * ) Notice: Subject to any disclaimer, the term of this patent is extended or adjusted under 35 U.S.C. 154(b) by 349 days.

(21) Appl. No.: 15/783,179

(22) Filed: Oct. 13, 2017

(65) Prior Publication Data

US 2019/0114336 A1    Apr. 18, 2019

(51) Int. Cl.
*G06F 17/20* (2006.01)
*G06F 16/21* (2019.01)
*G05B 19/418* (2006.01)
*G06F 8/71* (2018.01)
*G06F 16/22* (2019.01)

(52) U.S. Cl.
CPC ..... *G06F 16/219* (2019.01); *G05B 19/41845* (2013.01); *G05B 19/41885* (2013.01); *G06F 8/71* (2013.01); *G06F 16/22* (2019.01); *G05B 2219/31418* (2013.01)

(58) Field of Classification Search
CPC .......................................................... G06F 8/20
USPC ........................................ 707/695; 717/170
See application file for complete search history.

(56) References Cited

U.S. PATENT DOCUMENTS

| 5,881,292 | A | * | 3/1999 | Sigal | G06F 8/71 |
| | | | | | 707/999.2 |
| 8,700,669 | B1 | * | 4/2014 | Glidewell | G06F 11/3034 |
| | | | | | 707/793 |
| 2007/0299858 | A1 | * | 12/2007 | Norcott | G06F 16/211 |
| 2009/0222495 | A1 | | 9/2009 | Kleyer et al. | |
| 2012/0233194 | A1 | * | 9/2012 | Ohyu | G06Q 50/22 |
| | | | | | 707/758 |
| 2017/0286910 | A1 | | 10/2017 | Botterill et al. | |

* cited by examiner

*Primary Examiner* — Baoquoc N To
(74) *Attorney, Agent, or Firm* — Sughrue Mion, PLLC

(57) ABSTRACT

A system and method for managing and analyzing plant design data includes a configuration item manager allows automatic configuration item management, intend of manual configuration item management, by automatically acquiring the design data which is synchronized with the actual plant, while preventing the design data analyzer from analyzing the design data in work status which has been changed but has not yet been applied to the plant, not synchronized with the actual plant.

17 Claims, 3 Drawing Sheets

SYSTEM AND METHOD FOR DESIGN DATA ANALYZING

TECHNICAL FIELD

Embodiments of the present invention generally relate to a system and a method for analyzing design data for an industrial plant.

BACKGROUND ART

An industrial plant has a variety of plant devices such as controllers, safety controllers, I/O modules and I/O and a variety of plant hardware and software components such as processor modules and power supply units. The plant devices and the software components are not permanently used and thus changed sometimes. A plant manager should know current plant devices and current plant components. For changing the plant devices and plant components, a plant engineer will change design data by an engineering tool, and change actual plant devices and plant components, and further apply the design data to the controllers and the safety controllers. The controllers and the safety controllers are configured to control a plant based on design data. Thus, a plant engineer has to apply the design data to the controllers and the safety controllers to allow the controllers and the safety controllers to control a plant based on the design data. It is possible to know the controllers and the safety controllers by analyzing design data as long as the design data are synchronized with the controllers and the safety controllers. The term "synchronized" used herein refers to a status where design data were applied to the controllers and the safety controllers, wherein the design data remain unchanged after the design data were applied. In other words, the phrase "design data synchronized with a device" refers to design data that have been applied to a device such as controller or safety controller but the design data remain unchanged yet by a plant engineer.

FIG. 1 is a block diagram illustrating a system 10000 for managing and analyzing design data for a plant in the related art. Design data is applied to any of controller, safety controller, I/O module, or I/O in a plant 15000. A design data analyzer 12000 is configured to analyze the design data. When the engineer changes design data in a plant-downloading design data storage 14000 by an engineering tool 13000, the engineer faces two technical issues. An engineer may not change the design data during the analysis of the design data by the design data analyzer due to the issue of data conflict and data consistency. Secondly, there is a need to know which part of the design data, also referred to as engineering data, has been changed but not yet synchronized with and/or downloaded to the plant, because this part of the design data cannot be analyzed in order to obtain the current configuration information of the plant. But in previous practice, it was difficult to know which part of the design data has been changed and/or edited but not yet synchronized with and/or downloaded to the actual devices of the plant. If the engineer changes the design data during the analysis of the design data by the design data analyzer, then the changed design data is applied to the controller or the safety controller even the design data analyzer analyzes the previous design data which is not the changed design data actually applied to the controller or the safety controller. Namely, the design data analyzer analyzes the design data which is not synchronized with the controller or the safety controller. The term "design data synchronized with device or plant" used herein refers to design data which is currently being applied to device or plant.

SUMMARY

In some aspects, a system and method for managing and analyzing plant design data includes a configuration item manager allows automatic configuration item management, instead of manual configuration management, by automatically acquiring the design data which is synchronized with the actual plant, while preventing the design data analyzer from analyzing the design data in work status which has been changed but has not yet been applied to the plant, not synchronized with the actual plant.

Design data in a master status of a master status latest version is acquired from a design data version management system configured to acquire design data from a design data storage that stores design data which are changeable via an engineering tool. The design data version management system is configured to manage plural different versions of design data wherein the design data include master design data in a master status in which design data have been applied to the plant and work design data in a work status in which design data have not been applied to and are to be applied to the plant. There is analyzed plant configuration of design data in the master status of a master status latest version acquired by the design data acquisition, independently of changing design data in the design data storage.

To implement the system and method for managing and analyzing plant design data, a system may include, but is not limited to, a plant-downloading design data; a design data version management computer device; an analysis design data; a master design data analyzer; and an engineering tool. The plant-downloading design data is design data to be downloaded to a plant and to be applied to the plant. The design data version management computer device is configured to acquire the design data from the plant-downloading design data. The analysis design data is separate from the plant-downloading design data. The analysis design data is design data in master status which are downloaded from the design data version management, wherein the design data in master status has been downloaded from the plant-downloading design data to the plant and applied to the plant. The master design data analyzer is configured to acquire the design data in master status from the analysis design data and configured to analyze the design data in master status, the master design data analyzer configured to be prohibited from having an access to the plant-downloading design data. The engineering tool is configured to have an access to the plant-downloading design data and configured to change the design data in the plant-downloading design data. The engineering tool other than the design data acquisition (DDA) is configured to be prohibited from having an access to the analysis design data and from changing the design data in the analysis design data. The engineering tool includes the automation design organizer. The automation design organizer includes the configuration item management. The configuration item management includes the design data acquisition (DDA). The design data acquisition (DDA) may include, but is not limited to, a master design data analyzer. The master design data analyzer is configured to access and analyze the analysis design data.

The above-described system and method allows an engineer to change design data during analysis of design data by the design data analyzer, while preventing the design data analyzer from analyzing the design data in work status which has been changed but has not yet been applied to the plant, and in other words, the design data in work status which is not synchronized with the actual plant.

The above-described system and method provide technical improvements in allowing for downloading design data in master status of the master status latest version from a design data version management to an analysis design data separate from a plant-downloading design data from which the design data is downloaded to the plant and applied to the plant, wherein the engineering tool is allowed to access to the plant-downloading design data and to change the design data in the plant-downloading design data, and wherein the engineering tool other than the design data acquisition (DDA) is prohibited to access the analysis design data and prohibited to change the design data in the analysis design data. The design data acquisition (DDA) includes the master design data analyzer that is configured to access and analyze the analysis design data. The design data acquisition (DDA) calls an application programming interface (API) from design data version manager for downloading the design data in the master status of the master status latest version and allowing the master design data analyzer to analyze the downloaded design data in the master status of the master status latest version.

Further, in case that the engineer changed design data during analysis of design data by the design data analyzer, the above-described system and method allows the design data analyzer to analyze design data in the master status which has been applied to the plant at a time an engineer to change design data and generate changed design data in work status for applying changed design data to the plant, so that the design data analyzer will provide an analysis result based on the design data in master status which is synchronized with the actual plant which is applied with the changed design data, while preventing the design data analyzer from analyzing the design data in work status which has been changed but has not yet been applied to the plant, and in other words, the design data in work status which is not synchronized with the actual plant.

EMBODIMENTS

Figure 1:
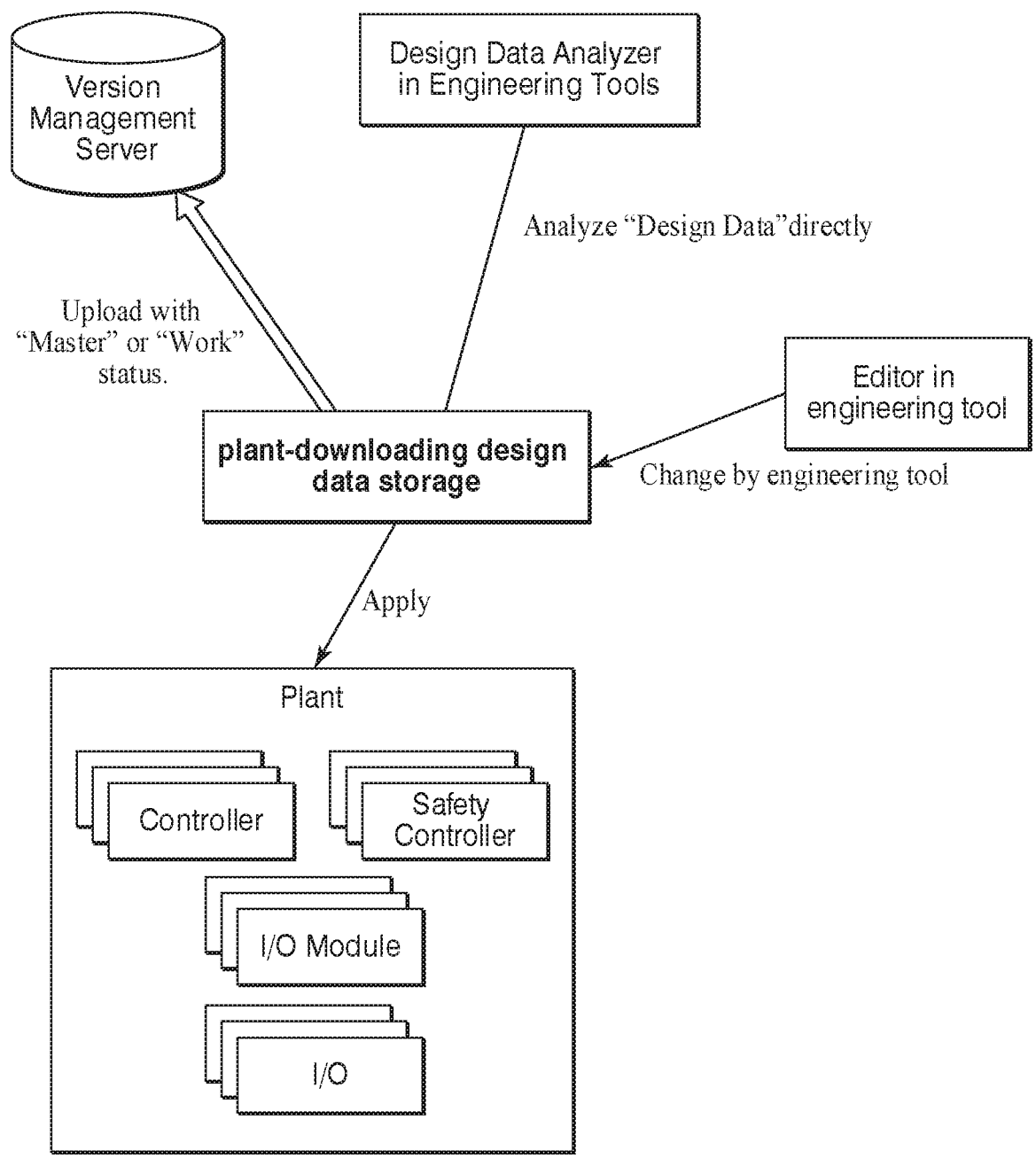
FIG. 1 is a block diagram illustrating a system for managing and analyzing design data for a plant in the related art.

In some aspects, a system and method for managing and analyzing plant design data includes a configuration item manager allows automatic configuration item management, instead of manual configuration management, by automatically acquiring the design data which is synchronized with the actual plant, while preventing the design data analyzer from analyzing the design data in work status which has been changed but has not yet been applied to the plant, not synchronized with the actual plant.

To implement the system and method for managing and analyzing plant design data. In some aspects, a system may include, but is not limited to: a design data storage; a design data version management; a configuration item management. The design data storage stores design data for a plant, wherein each set of design data having a respective version and a respective status, each version being associated with a respective point of time, each status being either a master status in which design data have been applied to the plant and a work status in which design data have not been applied to and are to be applied to the plant. The design data version management is accessible to the design data storage. The design data version management is configured to acquire plural sets of design data from the design data storage, and to manage plural different versions of design data independently of changing design data in the design data storage. The configuration item management is accessible to the design data version management. The configuration item management may include, but is not limited to: a design data acquisition (DDA) configured to acquire one or more sets of design data having one or more versions and having the master status from the design data version management independently of changing design data in the design data storage.

The term "work status" used herein refers to a status of design data which has been changed by any tool such as an engineering tool but have not yet been applied to a plant such as a field controller or a safety controller. The term "master status" used herein refers to a status of design data which has been changed by the engineering tool and then applied to the field controller or the safety controller. When the engineer applies the changed design data to the field controller or the safety controller, the changed design data as applied to the field controller or the safety controller is uploaded to the version management server with a master status.

The system can prevent the design data analyzer from analyzing the design data in work status which has been changed but has not yet been applied to the plant, and in other words, the design data in work status which is not synchronized with the actual plant.

In some cases, the design data acquisition is configured to automatically acquire the design data from the design data version management.

In some cases, the design data acquisition (DDA) of the configuration item management may further include, but is not limited to, a master design data analyzer configured to analyze plant configuration information included in the design data of the one or more versions and having the master status acquired by the design data acquisition, independently of changing design data in the design data storage.

In some cases, the master design data analyzer, configured to analyze plant configuration information, may be separate from the design data acquisition (DDA) but located within configuration item management.

In some cases, the master design data analyzer is configured to analyze plant configuration of design data in the master status of the master status latest version acquired by the design data acquisition, independently of changing design data in the design data storage.

In some cases, the design data analyzer is configured to analyze plant configuration of the design data in the master status having the master status latest version, which are independent of the design data in the design data storage.

The system will prevent the design data analyzer from analyzing the design data in work status which has been changed but has not yet been applied to the plant, and in other words, the design data in work status which is not synchronized with the actual plant.

In some cases, the master design data analyzer has information of a plurality of sets configuration items, information of each configuration item comprises: an configuration item category; a configuration item type belonging to the configuration item category; a configuration item name; and a configuration item full path, and wherein the master design data analyzer further has: a device property associated with each configuration item; and device remarks associated with the device property.

In some cases, the configuration item management may further include, but is not limited to, an implementation data acquisition (IDA) configured to send the field control system one or more queries for more detailed information for implementation of the field control system and acquire the more detailed information for implementation from the field control system.

In some cases, the configuration item management may further include, but is not limited to, a network device detection (NDD) configured to be accessible to a plurality of network devices connected to the field control system. The network device detection (NDD) is configured to scan and register PCs or network devices and acquire, for configuration items, information of configuration status of the plurality of network devices.

In some cases, the system may further include, but is not limited to, a design data editor device configured to edit or change design data stored in the design data storage, wherein the design data, which are stored in the design data storage and once edited or changed by the design data editor device, is in the work status until the design data is acquired by the field control system.

In some cases, the system may further include, but is not limited to, a configuration item editor accessible to the master design data analyzer, the configuration item editor configured to acquire, from the master design data analyzer, the information of a plurality of sets configuration items, the configuration item editor configured to represent the information of a plurality of sets configuration items in a form of table.

In some cases, the system may further include, but is not limited to, the configuration item editor is configured to represent the result of analysis that includes at least, but is not limited to, field control station; nodes of a plant network; I/Os; input-output modules; stations other than the field control stations; and connection between each field control station and input-output module.

In other aspects, the system may further include, but is not limited to, a method of analyzing design data for a plant may include, but is not limited to, uploading, from a design data storage to a design data version management, plural sets of design data for a plant, wherein each set of design data having a respective version and a respective status, each version being associated with a respective point of time, each status being either a master status in which design data have been applied to the plant and a work status in which design data have not been applied to and are to be applied to the plant; managing, by the design data version management, plural different versions of design data independently of changing design data in the design data storage; downloading, by the configuration item management, from the design data version management to a master design data analyzer, one or more sets of design data having one or more versions and having the master status from the design data version management independently of changing design data in the design data storage; and analyzing, by the master design data analyzer, plant configuration information included in the design data of the one or more versions and having the master status acquired by the design data acquisition, independently of changing design data in the design data storage, and independent of the design data in the design data storage.

The above-described system allows an engineer to change design data during analysis of design data by the design data analyzer, while preventing the design data analyzer from analyzing the design data in work status which has been changed but has not yet been applied to the plant, and in other words, the design data in work status which is not synchronized with the actual plant.

In some cases, the system may further include, but is not limited to, downloading the one or more sets of design data may include, but is not limited to, automatically downloading the one or more sets of design data, by the configuration item management.

In some cases, the system may further include, but is not limited to, analyzing, by the master design data analyzer, the plant configuration information may include, but is not limited to, analyzing plant configuration of design data in the master status of a master status latest version acquired by the design data acquisition, independently of changing design data in the design data storage.

In some cases, the system may further include, but is not limited to, analyzing, by the master design data analyzer, the plant configuration information may include, but is not limited to, analyzing plant configuration of the design data in the master status of the master status latest version, which are independent of the design data in the design data storage.

In other aspects, a system may include, but is not limited to, a design data version management and a master design data analyzer. The design data version management is configured to acquire plural sets of design data from a design data storage and to manage plural different versions of design data, wherein each set of design data having a respective version and a respective status, each version being associated with a respective point of time, each status being either a master status in which design data have been applied to the plant and a work status in which design data have not been applied to and are to be applied to the plant. The master design data analyzer is configured to analyze plant configuration information included in the design data of the one or more versions and having the master status acquired by the design data acquisition, independently of changing design data in the design data storage, and independent of the design data in the design data storage.

In some cases, the system may further include, but is not limited to, the master design data analyzer has information of a plurality of sets configuration items, wherein information of each configuration item may include, but is not limited to, an configuration item category; at least one configuration item type belonging to the configuration item category; a plurality of configuration item properties belonging to each of the at least one configuration item type; a device property associated with each configuration item property; and device remarks associated with the device property.

In other aspects, the system may further include, but is not limited to, a configuration item editor accessible to the master design data analyzer. The configuration item editor is configured to acquire, from the master design data analyzer, a result of analysis made by the master design data analyzer of the at least design data in the master status of the master status latest version. The result of analysis represents information including a current configuration of the plant.

In still other aspects, a system may include, but is not limited to, a configuration item management; and a master design data analyzer. The configuration item management may include, but is not limited to, a design data acquisition (DDA) accessible to a design data version management configured to manage plural different versions of design data stored in a design data storage wherein the design data include master design data in a master status in which design data have been applied to the plant and work design data in a work status in which design data have not been applied to and are to be applied to the plant, the design data acquisition (DDA) configured to automatically acquire master design data in the master status of a master status latest version from the design data version management. The master design data analyzer is configured to analyze plant configuration of design data in the master status of a master status latest version acquired by the design data acquisition, independently of changing design data in the design data storage.

Design data in a master status of a master status latest version is acquired from a design data version management system configured to acquire design data from a design data storage that stores design data which are changeable via an engineering tool. The design data version management system is configured to manage plural different versions of design data wherein the design data include master design data in a master status in which design data have been applied to the plant and work design data in a work status in which design data have not been applied to and are to be applied to the plant. There is analyzed plant configuration of design data in the master status of a master status latest version acquired by the design data acquisition, independently of changing design data in the design data storage.

The above-described system and method provide technical improvements in allowing for downloading design data in the master status of the master status latest version from a design data version management to an analysis design data separate from a plant-downloading design data from which the design data is downloaded to the plant and applied to the plant, wherein the engineering tool is allowed to access to the plant-downloading design data and to change the design data in the plant-downloading design data, and wherein the engineering tool other than the design data acquisition (DDA) is prohibited to access the analysis design data and prohibited to change the design data in the analysis design data. The design data acquisition (DDA) includes the master design data analyzer that is configured to access and analyze the analysis design data. The design data acquisition (DDA) calls an application programming interface (API) from design data version manager for downloading the design data in the master status of the master status latest version and allowing the master design data analyzer to analyze the downloaded design data in the master status of the master status latest version. The above-described system and method allows an engineer to change design data during analysis of design data by the design data analyzer.

Further, in case that the engineer changed design data during analysis of design data by the design data analyzer, the above-described system and method allows the design data analyzer to analyze design data in the master status which has been applied to the plant at a time an engineer to change design data and generate changed design data in work status for applying changed design data to the plant, even if the design data analyzer provides an analysis result based on the design data in master status which is not synchronized with the actual plant which is applied with the changed design data.

The above-described configuration item manager can solve the technical issues. The above-described configuration item manager is designed to allow an engineer to know statuses of the plant. The term "configuration item" used herein refers to an element for configuration of a distinctive hardware and/or software component at any level of a configuration hierarchy, wherein the distinctive hardware and/or software component is separable or distinctively configurable from others. Typical examples of the "configuration item" may include, but are not limited to, a field control system/station (FCS) or a safety control system/station (SCS), each processor included in the FCS or the SCS, a power unit, and a software license allocated to each system such as the field control system (FCS) or safety control system (SCS). In other words, any hardware and/or software component at any level of the configuration hierarchy can be defined as a configuration item. The configuration item manager may include, but is not limited to, a design data acquisition (DDA); an implementation data acquisition (IDA); and a network device detection (NDD). The implementation data acquisition (IDA) is configured to send the field control system one or more queries for more detailed information for implementation of the field control system and acquire the more detailed information for implementation from the field control system. User selects target devices such as the field controllers of the implementation data acquisition (IDA) via a configuration item editor CI Editor. Usually, the configuration items are registered by the design data acquisition (DDA). User runs the implementation data acquisition (IDA) and the implementation data acquisition (IDA) sends queries to the target devices such as the field controllers.

The design data acquisition (DDA) is designed to acquire master design data from the design data version management, wherein the design data version management manages both the master design data and the work design data. The design data acquisition (DDA) is designed to acquire master design data for the purpose of allowing the master design data analyzer to analyze plant configuration data in the master design data and acquire the current plant configurations. In some examples, the current plant configurations may include, but are not limited to, the number of field controllers (FCS) and what I/O modules belonging to each field controller as well as connection status between each I/O module to the field controller (FCS). The configuration item editor has a display. The configuration item editor is configured to acquire and display on its display screen the analyzed plant configuration given by the master design data analyzer that analyzed the plant configuration data in the master design data. Namely, User selects target devices such as the field controllers of the implementation data acquisition (IDA) via a configuration item editor CI Editor. Usually, the configuration items are registered by the design data acquisition (DDA). User runs the implementation data acquisition (IDA) and the implementation data acquisition (IDA) sends one or more queries to the field controllers (FCS) and what I/O modules. The implementation data acquisition (IDA) acquires detailed information for implementation regarding the field controllers (FCS) and what I/O modules as well as formation of versions of a variety of software products by using general protocols.

The network device detection (NDD) is configured to be accessible to a plurality of network devices connected to the field control system, the network device detection (NDD) configured to acquire, for configuration items, configuration status of the plurality of network devices.

The above-described configuration item manager may have a consolidated set of conversion rules or a consolidated table that is used for converting into a list of plant configuration items that configure a plant system from a database for engineering data of controllers for controlling devices installed in a plant such as field devices. The consolidated set of the conversion rules or the consolidated configuration item table integrates all or the majority of necessary engineering data at a single location. Without using the concept of "configuration item", the engineering data are spatially distributed at different locations.

The above-described configuration item manager may also have an configuration item editor configured to present or output the consolidated set of conversion rules or the consolidated table that is used for converting into a list of plant configuration items that configure a plant system from a database for engineering data of controllers for controlling devices installed in a plant such as field devices. In some cases, the configuration item editor is configured to display on its display screen a table that is used for converting into a list of plant configuration items that configure a plant system from a database for engineering data of controllers for controlling devices installed in a plant such as field devices.

The above-described configuration item manager allows an engineer may change the design data during the analysis of the design data by the design data analyzer since the system is configured to cause no possibility of data conflict and no data consistency. In addition, the above-described configuration item manager allows an engineer to know which part of the design data, also referred to as engineering data, has been changed but not yet synchronized with and/or downloaded to the plant, because this part of the design data can be analyzed in order to obtain the current configuration information of the plant. The above-described configuration item manager makes it possible for an engineer to know which part of the design data has been changed and/or edited but not yet synchronized with and/or downloaded to the actual devices of the plant.

The above-described configuration item manager allows the above-described automatic configuration item management, instead of manual configuration management. The manual configuration management system will cause that an engineer to fail to update the design data and to update the design data by error, which results in data conflict and data consistency. The above-described configuration item manager allows the above-described automatic configuration item management which automatically acquire the design data which is synchronized with the actual plant, while preventing the design data analyzer from analyzing the design data in work status which has been changed but has not yet been applied to the plant, and in other words, the design data in work status which is not synchronized with the actual plant. There is a need for an engineer to know which part of the design data, also referred to as engineering data, has been changed but not yet synchronized with and/or downloaded to the plant, because this part of the design data cannot be analyzed in order to obtain the current configuration information of the plant. But the above-described configuration item manager makes it possible for an engineer to know which part of the design data has been changed and/or edited but not yet synchronized with and/or downloaded to the actual devices of the plant.

In some cases, an engineer of a client company may use the engineering tool and change the design data without authorization of an manager engineer of a manager company which manages the other components of the system than the engineering tool. In this case, the above-described configuration item manager configured to allow the above-described automatic configuration item management, instead of manual configuration item management, would be useful to automatically acquire the design data which is synchronized with the actual plant, while preventing the design data analyzer from analyzing the design data in work status which has been changed but has not yet been applied to the plant, and in other words, the design data in work status which is not synchronized with the actual plant.

Illustrative Examples

Figure 2:
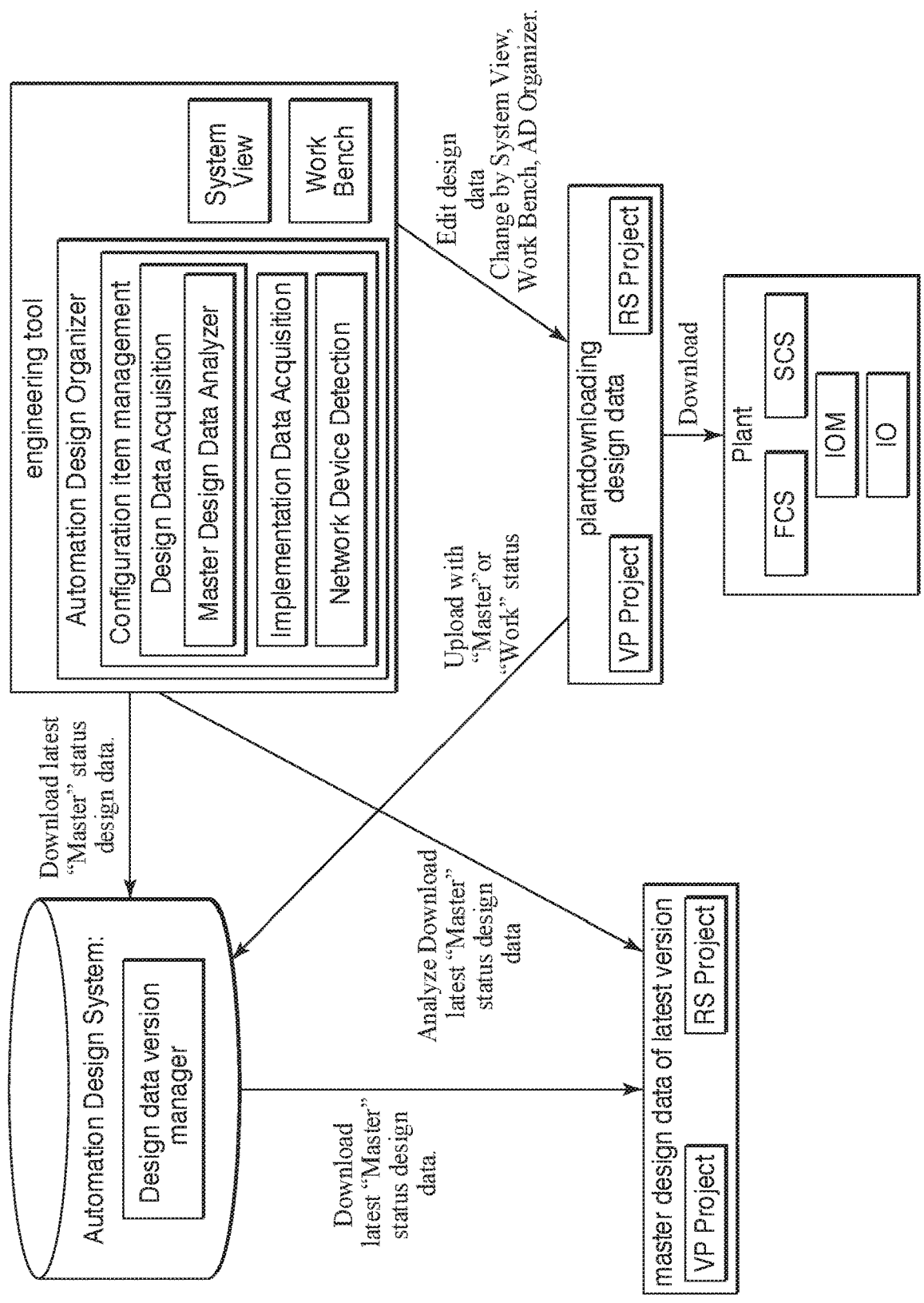
FIG. 2 is a block diagram illustrating a system for managing and analyzing design data for a plant in some embodiments of the invention.
Figure 3:
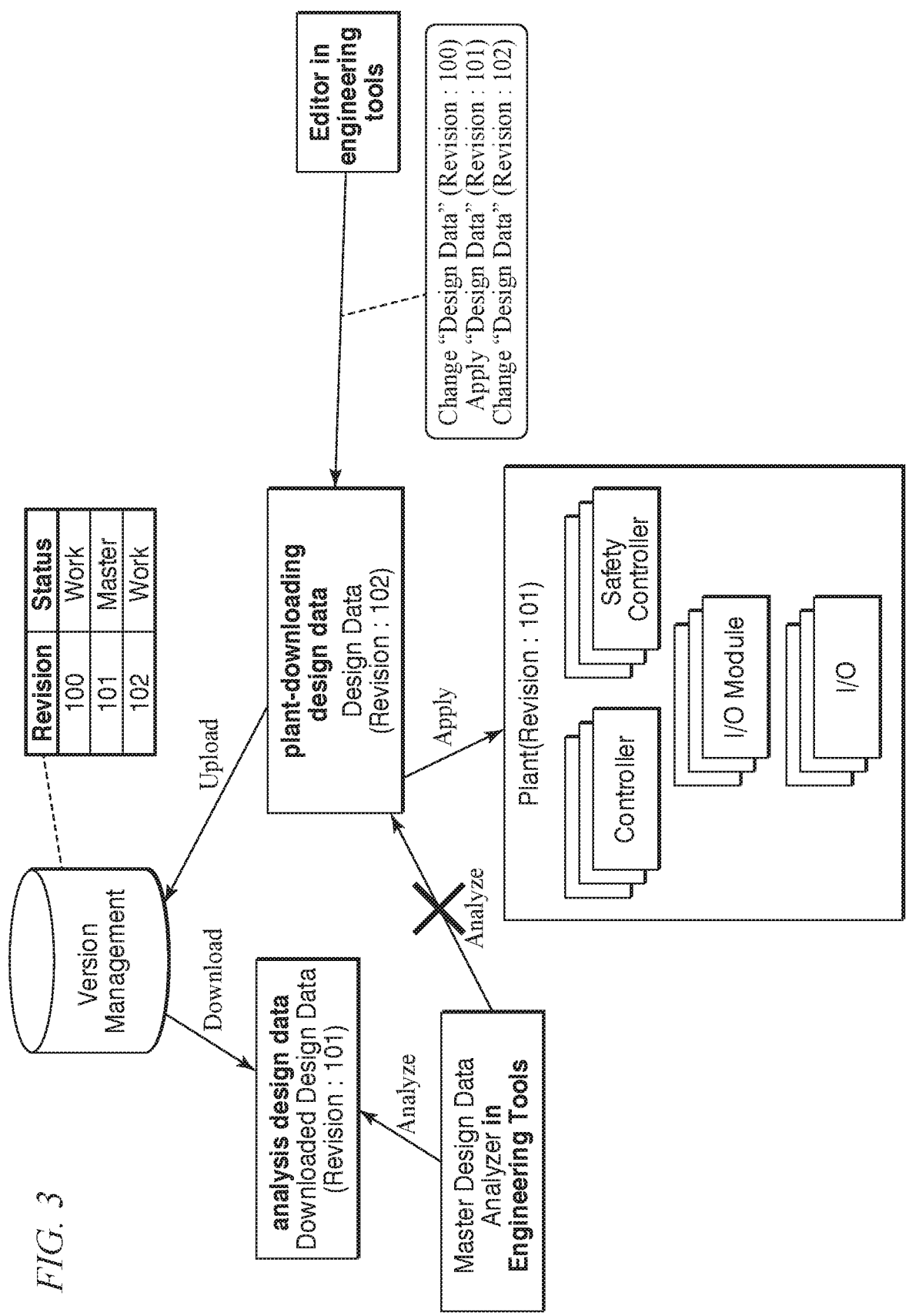
FIG. 3 is a block diagram illustrating a way of analyzing design data in master status synchronized with a plant in some embodiments of the invention.

Whereas the above-described embodiments are a full of descriptions, for further facilitation to understand the above-described embodiments, some illustrative examples will be given with reference to the drawings. FIG. 2 is a block diagram illustrating a way of managing and analyzing design data for a plant in some embodiments of the invention. FIG. 3 is a block diagram illustrating a way of analyzing design data in master status synchronized with a plant and of in some embodiments of the invention.

A system 20000 for acquiring and analyzing design data may include, but is not limited to, an engineering tool 21000, an automation design system 22000, a plant-downloading design data 23000, an analysis design data 24000 in master status of a master status latest version, and a plant 25000.

The plant-downloading design data 23000 refers to design data which is to be downloaded and applied to the plant device.

The automation design system 22000 may include, but is not limited to a design data version management 22100. The design data version management 22100 is accessible to the plant-downloading design data 23000. The design data version management 22100 is configured to acquire plural sets of design data in both master status and work status from the plant-downloading design data 23000. The design data version management 22100 is configured to manage plural different versions of design data in both master status and work status.

The engineering tool 21000 may include, but is not limited to, an automation design organizer 21100, a system view 21200, and a work bench 21300. The automation design organizer 21100 may include, but is not limited to, a configuration item management 21110. The configuration item management 21110 may include, but is not limited to, a design data acquisition (DDA) 21112, an implementation data acquisition (IDA) 21116, and a network device detection (NDD) 21118. The design data acquisition (DDA) 21112 may further include, but is not limited to, a master design data analyzer 21114.

The master design data analyzer 21114 is configured to analyze plant configuration information included in the design data 24000 in the master status of the master status latest version acquired by the design data acquisition, independently of changing design data in the plant-downloading design data 23000 via the engineering tool 23000.

The engineering tool 23000 is configured to have an access to the plant-downloading design data 23000 and configured to change the design data in the plant-downloading design data 23000. The engineering tool 23000 other than the design data acquisition (DDA) 21112 is configured to be prohibited from having an access to the analysis design data 24000 and from changing the design data in the analysis design data 24000. The master design data analyzer 21114 in the configuration item management 21110 in the automation design organizer 21100 is configured to access and analyze the analysis design data 24000.

The plant-downloading design data 23000 is design data for a plant, wherein each set of design data having a respective version and a respective status, each version being associated with a respective point of time, each status being either a master status in which design data have been applied to the plant and a work status in which design data have not been applied to and are to be applied to the plant.

The plant 25000 may include, but is not limited to the field controllers (FCS) or the safety controllers (SCS), node devices, the I/O modules (IOM) and the I/Os (IOs) to which the design data in work status is newly applied.

The analysis design data 24000 is separate from the plant-downloading design data 23000. The analysis design data 24000 is design data in master status which are downloaded from the design data version management 22100, wherein the design data in work status has been downloaded from the plant-downloading design data 23000 to the plant 25000 and applied to the plant 25000.

The configuration item management 21110 is accessible to the design data version management 22100. The configuration item management 21110 may include, but is not limited to, the design data acquisition (DDA) 21112, the implementation data acquisition (IDA) 21116, and the network device detection (NDD) 21118. The design data acquisition (DDA) 21112 is configured to acquire design data in the master status of the master status latest version from the design data version management 22100 independently of changing the plant-downloading design data 23000 via the engineering tool. The implementation data acquisition (IDA) 21116 is configured to send the field control system one or more queries for more detailed information for implementation of the field control system and to acquire the more detailed information for implementation from the field control system. The network device detection (NDD) 21118 is configured to be accessible to a plurality of network devices connected to the field control system. The network device detection (NDD) 21118 is configured to acquire, for configuration items, configuration status of the plurality of network devices.

User tries to investigate current configuration information of the plant 25000, by acquiring and analyzing engineering/design data. Design data in the master status of the master status latest version is downloaded from the design data version management 22100 to the analysis design data storage 26000. The master design data analyzer 21114 analyzes master design data in master status which has been downloaded from the design data version management 22100, wherein the master design data in master status shows currently applied or implemented configurations of the devices of the plant 25000. User can know currently applied or implemented configurations of the devices of the plant 25000. This feature downloads the design data in master status of the master status latest version from the design data version management 22100 to an analysis location for analysis where the analysis design data storage 26000 is located for allowing the design data analyzer 22000 to acquire and analyze the design data in master status of the master status latest version. The location of the analysis design data storage 26000 might either be the same as or different from, the location of design data acquisition (DDA) 21112 in the automation design organizer 21100 of the engineering tool 21000.

FIG. 3 shows the example in which the engineer did the followings:
Change design data (at this time, the revision is 100.);
Apply design data to plant (at this time, the revision is 101.); and
Change design data again (at this time, the revision is 102.).

Thus, design data contents are revision 102, but actual plant contents are revision 101. In this case, the engineer cannot analyze design data directly because it is not synchronized with the actual plant. The engineer should analyze the revision 101. Therefore, this function gets it in the following steps:

The first operation is to ask the version management server about the design data in the master status of the master status latest versions.

In response to the question, the design data version management 22100 returns the revision 101 because it was uploaded in the master status.

The second operation is to download design data of revision 101 from the design data version management 22100 to the analysis design data storage 26000.

The design data version management 22100 sends design data of revision 101 to the analysis design data storage 26000.

The master design data analyzer 21114 acquires the design data of revision 101 from the analysis design data storage 26000 and analyzes the design data of revision 101 which is not original design data in the plant-downloading design data 23000 but downloaded master status design data in the analysis design data storage 26000.

FIG. 3 illustrates that the design data analyzer cannot analyze design data directly because it is not synchronized with the actual plant. The design data analyzer 22000 analyzes downloaded design data in master status which is downloaded from the design data version management 22100. The design data analyzer 22000 can be designed to create "configuration item" from design data. The configuration item has "category", "type", and "property". A consolidated set of conversion rules or a consolidated table is used for conversion of a database for engineering data of distributed control systems/stations (DCSs) into a list of plant configuration items that configure a plant system. A consolidated set of conversion rules or a consolidated table is used for conversion of a database for engineering data of safety control systems/stations (SCSs) into a list of plant configuration items that configure a plant system.

The "configuration item category" column, the "configuration item type" column, and the "configuration item property" column have "category", "type" and "property" of "configuration item". "VP Property" column and "RS Property" have data of design data. In some cases, design data does not have enough information to create the configuration Item. In this case, the design data analyzer creates the configuration item. For example, design data does not have "Processor Module" of "Controller" information. The design data analyzer can get "Controller Type" from design data and creates "Configuration Item" of "Processor Module" from "Controller Type".

The master design data analyzer 21114 read master design data using any available interface such as an object linking and embedding (OLE) interface that is provided by the system, and execution file "exe" that is provided by the system, and directly analyze the design data file which contains the design data.

The configuration item management 21110 has a configuration item editor and a conversion rule or table that is used for conversion of a database for engineering data of distributed control systems (DCSs) or safety control systems (SCSs) into a list of plant configuration items that configure a plant system. A list in a table form can be used of plant configuration items that configure a plant system converted from the database for engineering data of distributed control systems (DCSs). A list of plant configuration items can be used to configure a plant system converted from the database for engineering data of safety control systems (SCSs). The list is displayed on the configuration item editor included in the configuration item management 21110. The configuration item can be defined in a form of hierarchy of configuration item category. The "configuration item category" can be defined to follow the hierarchy, showing from the top to the bottom, station/PC, station components which belong to the station, field network devices which belong to the station component. The orders from the top to the bottom are optional. The configuration item property has a configuration item full path (CI Full Path) which uniformly identifies the configuration item to allow for expression of the configuration item in the form of hierarchy, for example, [System Project Name] ¥ [Station Name] ¥ [Train Name] ¥ [Node Name] ¥ [Unit Name]. The configuration item can be defined for each of different levels of the hierarchy. For example, a field control station "Station" can be defined as a configuration item at upper level that the configuration item management 21110 can recognize. A processor module "Processor Module" which belongs to the field control station "station" can be defined as another configuration item at a lower level that the configuration item management 21110 can recognize. A power supply unit "Power Supply" which belongs to the field control station "station" can be defined as still another configuration item at another lower level that the configuration item management 21110 can recognize. The configuration item allows the configuration item management 21110 to manage the plant at each and every level. "VP Project" for Distributed Control System (DCS) and "SCS Project" for Safety Control System (SCS)

The above system can solve the above-mentioned two technical issues. An engineer may change the design data during the analysis of the design data by the design data analyzer. If the engineer changes the design data during the analysis of the design data by the design data analyzer, then the changed design data is applied to the controller or the safety controller even the design data analyzer analyzes the previous design data which is not the changed design data actually applied to the controller or the safety controller. Namely, the design data analyzer analyzes the design data which is not synchronized with the controller or the safety controller. The term "design data synchronized with device or plant" used herein refers to design data which is currently being applied to device or plant.

Each element or device for the system or apparatus described above can be implemented by hardware with or without software. In some cases, the system or apparatus may be implemented by one or more hardware processors and one or more software components wherein the one or more software components are to be executed by the one or more hardware processors to implement each element or device for the system or apparatus. In some other cases, the system or apparatus may be implemented by a system of circuits or circuitry configured to perform each operation of each element or device for the system or apparatus.

The systems and methods in the above-described embodiments may be deployed in part or in whole through a machine or circuitry that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods, devices, apparatus, and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The above described snapshot search system or apparatus described above can be implemented by in part or entirely artificial intelligence. The artificial intelligence snapshot search system can include snapshot search technology, fuzzy logic and neural networks that enable user to automatically conduct snapshot search over a plurality of field devices in a plant.

While certain embodiments of the present inventions have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising:
   1) a design data storage that stores design data for a plant, wherein each set of design data having a respective version and a respective status, each version being associated with a respective point of time, each status being either a master status in which design data have been applied to the plant and a work status in which design data have not been applied to and are to be applied to the plant;
   2) a design data version management accessible to the design data storage, the design data version management configured to acquire plural sets of design data from the design data storage, and to manage plural different versions of design data; and
   3) a configuration item management accessible to the design data version management, the configuration item management comprising:
      3-1) a design data acquisition (DDA) configured to acquire one or more sets of design data having one or more versions and having the master status from the design data version management independently of changing design data in the design data storage.

2. The system according to claim 1, wherein the design data acquisition (DDA) is configured to automatically acquire the design data from the design data version management.

3. The system according to claim 1, further comprising:
   4) a master design data analyzer configured to analyze plant configuration information included in the design data of the one or more versions and having the master status acquired by the design data acquisition (DDA), independently of changing design data in the design data storage.

4. The system according to claim 3,
   wherein the master design data analyzer is configured to analyze plant configuration of design data in the master status of a master status latest version acquired by the design data acquisition (DDA), independently of changing design data in the design data storage.

5. The system according to claim 4,
   wherein the master design data analyzer is configured to analyze plant configuration of the design data in the master status of the master status latest version, which are independent of the design data in the design data storage.

6. The system according to claim 3,
   wherein the master design data analyzer has information of a plurality of sets of configuration items, information of each configuration item comprises:
      a) a configuration item category;
      b) a configuration item type belonging to the configuration item category;
      c) a configuration item name; and
      d) a configuration item full path,
   wherein the master design data analyzer further has:
      e) a device property associated with each configuration item; and
      f) device remarks associated with the device property.

7. The system according to claim 5, wherein the configuration item management further comprises:
   3-2) an implementation data acquisition (IDA) configured to send the field control system one or more queries for more detailed information for implementation of the field control system and acquire the more detailed information from the field control system.

8. The system according to claim 7, wherein the configuration item management further comprises:
   3-3) a network device detection (NDD) configured to be accessible to a plurality of network devices connected to the field control system, the network device detection (NDD) configured to acquire, for configuration items, configuration status of the plurality of network devices.

9. The system according to claim 3, further comprising:
wherein the master design data analyzer has a consolidated set of conversion rules or a consolidated table that is used for converting into a list of plant configuration items that configure a plant system from a database for engineering data of controllers for controlling devices installed in a plant.

10. The system according to claim 9, further comprising:
a configuration item editor accessible to the master design data analyzer, the configuration item editor configured to acquire, from the master design data analyzer, the consolidated set of conversion rules or the consolidated table that is used for converting into the list of plant configuration items that configure a plant system from a database for engineering data of controllers for controlling devices installed in a plant.

11. The system according to claim 6, further comprising:
a configuration item editor accessible to the master design data analyzer, the configuration item editor configured to acquire, from the master design data analyzer, information of a plurality of sets configuration items, a device property associated with each configuration item and device remarks associated with the device property, information of each configuration item comprises:
a) a configuration item category;
b) a configuration item type belonging to the configuration item category;
c) a configuration item name; and
d) a configuration item full path.

12. The system according to claim 10,
wherein the configuration item editor is configured to represent the result of analysis that comprises: field control station; nodes of a plant network; I/Os; input-output modules; stations other than the field control stations; and connection between each field control station and input-output module.

13. A method of analyzing design data for a plant, the method comprising:
uploading, from a design data storage to a design data version management, plural sets of design data for a plant, wherein each set of design data having a respective version and a respective status, each version being associated with a respective point of time, each status being either a master status in which design data have been applied to the plant and a work status in which design data have not been applied to and are to be applied to the plant;
managing, by the design data version management, plural different versions of design data independently of changing design data in the design data storage;
downloading, by the configuration item management, from the design data version management to a master design data analyzer, one or more sets of design data having one or more versions and having the master status from the design data version management independently of changing design data in the design data storage; and
analyzing, by the master design data analyzer, plant configuration information included in the design data of the one or more versions and having the master status acquired by the design data acquisition (DDA), independently of changing design data in the design data storage, and independent of the design data in the design data storage.

14. The method according to claim 13, wherein downloading the one or more sets of design data comprises:
automatically downloading the one or more sets of design data, by the configuration item management.

15. The method according to claim 14, wherein analyzing, by the master design data analyzer, the plant configuration information comprises:
analyzing plant configuration of design data in the master status of a master status latest version acquired by the design data acquisition (DDA), independently of changing design data in the design data storage.

16. The method according to claim 15, wherein analyzing, by the master design data analyzer, the plant configuration information comprises:
analyzing plant configuration of the design data in the master status of the master status latest version, which are independent of the design data in the design data storage.

17. A method comprising:
acquiring design data in a master status of a master status latest version from a design data version management system configured to acquire design data from a design data storage that stores design data which are changeable via an engineering tool, the design data version management system configured to manage plural different versions of design data wherein the design data include master design data in a master status in which design data have been applied to the plant and work design data in a work status in which design data have not been applied to and are to be applied to the plant; and
analyzing plant configuration of design data in the master status of a master status latest version acquired by the design data acquisition (DDA), independently of changing design data in the design data storage.

* * * * *